US010396613B2

(12) United States Patent
Kanda et al.

(10) Patent No.: US 10,396,613 B2
(45) Date of Patent: Aug. 27, 2019

(54) ARMATURE, ROTATING ELECTRICAL DEVICE, AND ARMATURE MANUFACTURING METHOD (71) Applicant: ASMO CO., LTD., Kosai, Shizuoka-pref. (JP)

(72) Inventors: Hidenori Kanda, Toyohashi (JP); Shigeaki Kageme, Toyohashi (JP)

(73) Assignee: DENSO CORPORATION, Kariya, Aichi-Pref ( * ) Notice: Subject to any disclaimer, the term of this patent is extended or adjusted under 35 U.S.C. 154(b) by 676 days.

(21) Appl. No.: 14/509,047

(22) Filed: Oct. 8, 2014

(65) Prior Publication Data
US 2015/0102696 A1 Apr. 16, 2015

(30) Foreign Application Priority Data

Oct. 15, 2013 (JP) .................................. 2013-214925

(51) Int. Cl.
H02K 3/28 (2006.01)
H02K 1/26 (2006.01)
(Continued)

(52) U.S. Cl.
CPC ............... *H02K 3/28* (2013.01); *H02K 1/148* (2013.01); *H02K 1/185* (2013.01); *H02K 1/187* (2013.01);
(Continued)

(58) Field of Classification Search
CPC .......... H02K 3/28; H02K 1/148; H02K 1/185; H02K 1/187; H02K 1/26; H02K 3/18; H02K 15/022; Y10T 29/49009
(Continued)

(56) References Cited

U.S. PATENT DOCUMENTS 8,044,551 B2 * 10/2011 Kim ........................ H02K 1/18
310/214
2002/0093269 A1 * 7/2002 Harter .................... H02K 1/148
310/254.1
(Continued)

FOREIGN PATENT DOCUMENTS

CN 103248145 A 8/2013
JP 2013-132122 A 7/2013

OTHER PUBLICATIONS

English language translation of the following: Office action dated Jul. 30, 2018 from the SIPO in a Chinese patent application No. 201410531258.4 corresponding to the instant patent application. This office action translation is submitted now in order to supplement the understanding of the cited reference which is being disclosed in the instant Information Disclosure Statement.

*Primary Examiner* — Julio C. Gonzalez
*Assistant Examiner* — Ahmed Elnakib
(74) *Attorney, Agent, or Firm* — Solaris Intellectual Property Group, PLLC (57) ABSTRACT An armature provided with: plural core configuration members that configure an armature core and are segmented from each other on progression along the circumferential direction of the armature core; plural insulators that each include plural insulating portions mounted to the core configuration members and a coupling portion that couples the plural insulating portions together; plural windings that respectively include plural winding portions, wound on the core configuration members with the insulating portions interposed between the winding portions and the core configuration members, and a crossing wire that connects the plural winding portions together; a fitting portion that couples together adjacent core configuration members out of the plural core configuration members; and an exposing portion (Continued)

that is formed to the plural insulators and exposes the fitting portion when viewed along the axial direction of the armature core.

15 Claims, 10 Drawing Sheets

(51) Int. Cl.
  *H02K 3/18* (2006.01)
  *H02K 15/02* (2006.01)
  *H02K 1/14* (2006.01)
  *H02K 1/18* (2006.01)
(52) U.S. Cl.
  CPC .................. *H02K 1/26* (2013.01); *H02K 3/18* (2013.01); *H02K 15/022* (2013.01); *Y10T 29/49009* (2015.01)
(58) Field of Classification Search
  USPC ........... 310/216.009, 216.008, 216.011, 208, 310/206.11, 216.51, 216.61, 216.86, 310/216.109, 215, 214; 29/596, 598
  See application file for complete search history.

(56) References Cited

U.S. PATENT DOCUMENTS

| | | | | |
|---|---|---|---|---|
| 2002/0113518 | A1* | 8/2002 | Hsu ........................ | H02K 1/148 310/418 |
| 2003/0214197 | A1* | 11/2003 | De Luca ................ | H02K 1/148 310/216.084 |
| 2009/0127972 | A1* | 5/2009 | Ishida .................... | H02K 1/148 310/216.074 |
| 2012/0139385 | A1* | 6/2012 | Sawada .................. | H02K 1/148 310/216.074 |
| 2013/0162098 | A1* | 6/2013 | Furuhashi ................ | H02K 3/38 310/215 |
| 2013/0200742 | A1* | 8/2013 | Seki ........................ | H02K 3/28 310/195 |

* cited by examiner

ARMATURE, ROTATING ELECTRICAL DEVICE, AND ARMATURE MANUFACTURING METHOD

CROSS-REFERENCE TO RELATED APPLICATION

This application is based on and claims priority under 35 USC 119 from Japanese Patent Application No. 2013-214925 filed on Oct. 15, 2013, which is incorporated by reference herein.

BACKGROUND

Technical Field

The present invention relates to an armature, a rotating electrical device, and a manufacturing method of the armature.

Related Art

The following is an example of an armature including an armature core segmented in the circumferential direction (see, for example Japanese Patent Application Laid-Open (JP-A) No. 2013-132122 (Patent Document 1)). The armature described in Patent Document 1 is provided with an armature core segmented into six core configuration members (core elements), three insulators, and plural windings forming U, V, W phases.

In this armature, plural mutually independent armature configuration sections (stator elements) are configured by assembling pairs of the core configuration members to the respective insulators, and by winding the respective windings onto the pairs of core configuration members, with the insulators interposed between the windings and the core configuration members. The armature is then configured by fitting the plural armature configuration sections together in the axial direction.

However, the armature described above presumes that adjacent core configuration members out of the plural core configuration members are coupled by fitting portions in order to couple the armature core, segmented in the circumferential direction, together into a ring shape. When coupling adjacent core configuration members together using fitting portions in this way, it is desirable to have excellent ease of assembly when fitting the plural armature configuration sections together in the axial direction.

An object of the present invention, therefore, is excellent ease of assembly when fitting the plural armature configuration sections together in the axial direction.

SUMMARY

In order to achieve the above object, an armature according to a first aspect of the present invention includes: plural core configuration members that configure an armature core and are segmented from each other on progression along the circumferential direction of the armature core; plural insulators that each include plural insulating portions mounted to the core configuration members and a coupling portion that couples the plural insulating portions together; plural windings that respectively include plural winding portions, wound on the core configuration members with the insulating portions interposed between the winding portions and the core configuration members, and a crossing wire that connects the plural winding portions together; a fitting portion that couples together adjacent core configuration members out of the plural core configuration members; and an exposing portion that is formed to the plural insulators and exposes the fitting portion when viewed along the axial direction of the armature core.

A rotating electrical device according to a sixth aspect of the present invention includes the armature according to any one of the first to the fifth aspect.

A manufacturing method of an armature according to a seventh aspect is a manufacturing method of the armature according to any one of the first to the fifth aspects, including: an armature configuration section assembly process that assembles the plural armature configuration sections, in which the core configuration members are assembled to the insulating portions of each of the insulators, and the windings are wound on the core configuration members; and an armature assembly process that assembles the armature by fitting the plural armature configuration sections together in the axial direction, and by pressing and fitting the fitting portions together in the axial direction through the exposing portions using a pressing jig.

BRIEF DESCRIPTION OF THE DRAWINGS

Exemplary embodiments of the present invention will be described in detail based on the following figures, wherein.

DESCRIPTION OF EMBODIMENTS

Explanation follows regarding an exemplary embodiment of the invention, with reference to the drawings.

Figure 1:
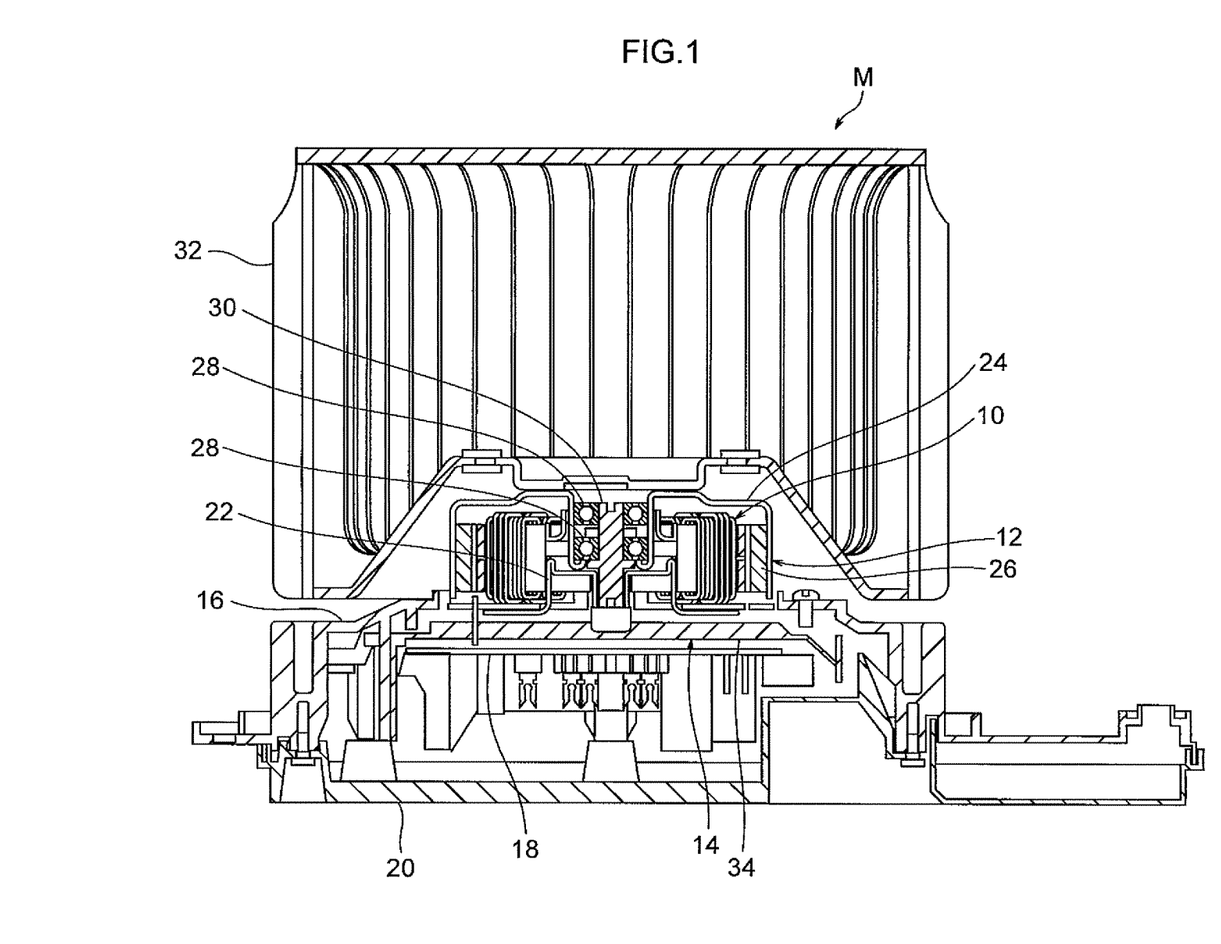
FIG. 1 is a vertical cross-section of a rotating electrical device according to an exemplary embodiment.

As illustrated in FIG. 1, a rotating electrical device M according to the present exemplary embodiment includes an armature 10 that is a stator, a rotor 12, a centerpiece 14, a motor holder 16, a circuit board 18, and a case 20.

The armature 10 is formed in a ring shape, and is specifically configured as described later. Shaft portions 22, that are provided to an axial center portion of the centerpiece 14, are press-fit to the inside of the armature 10, and the armature 10 is thereby supported by the centerpiece 14.

The rotor 12 includes a lidded circular cylinder shaped housing 24, and magnets 26 fixed to an inner peripheral face of the housing 24. The magnets 26 are provided facing the armature 10 at the radial direction outside of the armature 10. A pair of shaft bearings 28 is provided at an axial center portion of the housing 24, and a rotating shaft 30 is press-fit inside the pair of shaft bearings 28. The rotating shaft 30 is supported by the pair of shaft portions 22, and the rotor 12 is thereby rotatable with respect to the armature 10 and the centerpiece 14. As an example, a sirocco fan 32 is fixed to the rotor 12 so as to be capable of rotating as one therewith.

The centerpiece 14 includes a circular disc shaped main body portion 34, and the main body portion 34 is provided facing an opening of the housing 24. The motor holder 16 is assembled to the main body portion 34 from the armature 10 side of the main body portion 34, and the circuit board 18 is fixed to the main body portion 34 from the opposite side of the main body portion 34 to the armature 10 side. The case 20 is assembled to the main body portion 34 and the motor holder 16 from the opposite side of the circuit board 18 to the main body portion 34 side.

Detailed explanation follows regarding the armature 10 described above.

Figure 2:
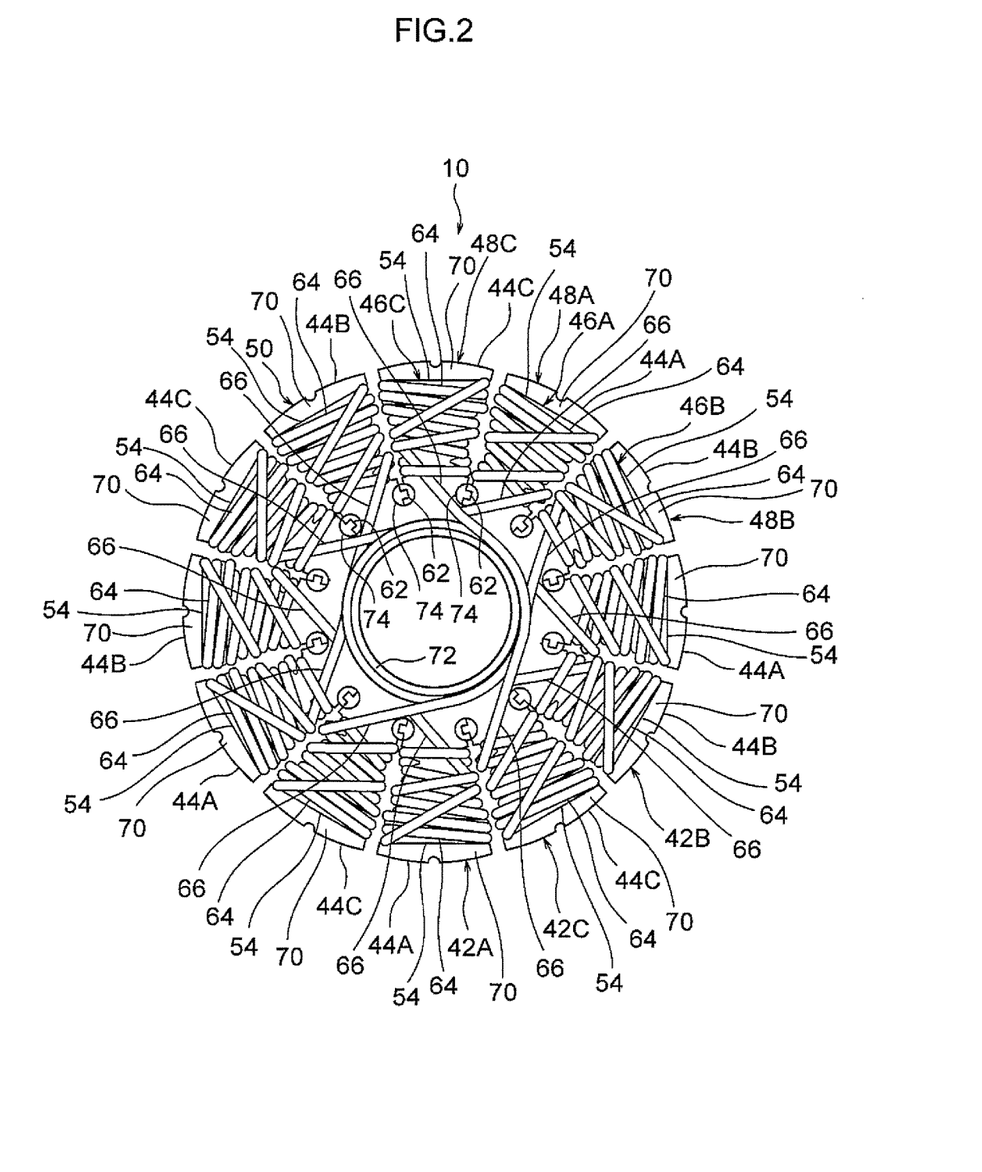
FIG. 2 is a plan view of an armature according to an exemplary embodiment.
Figure 3:
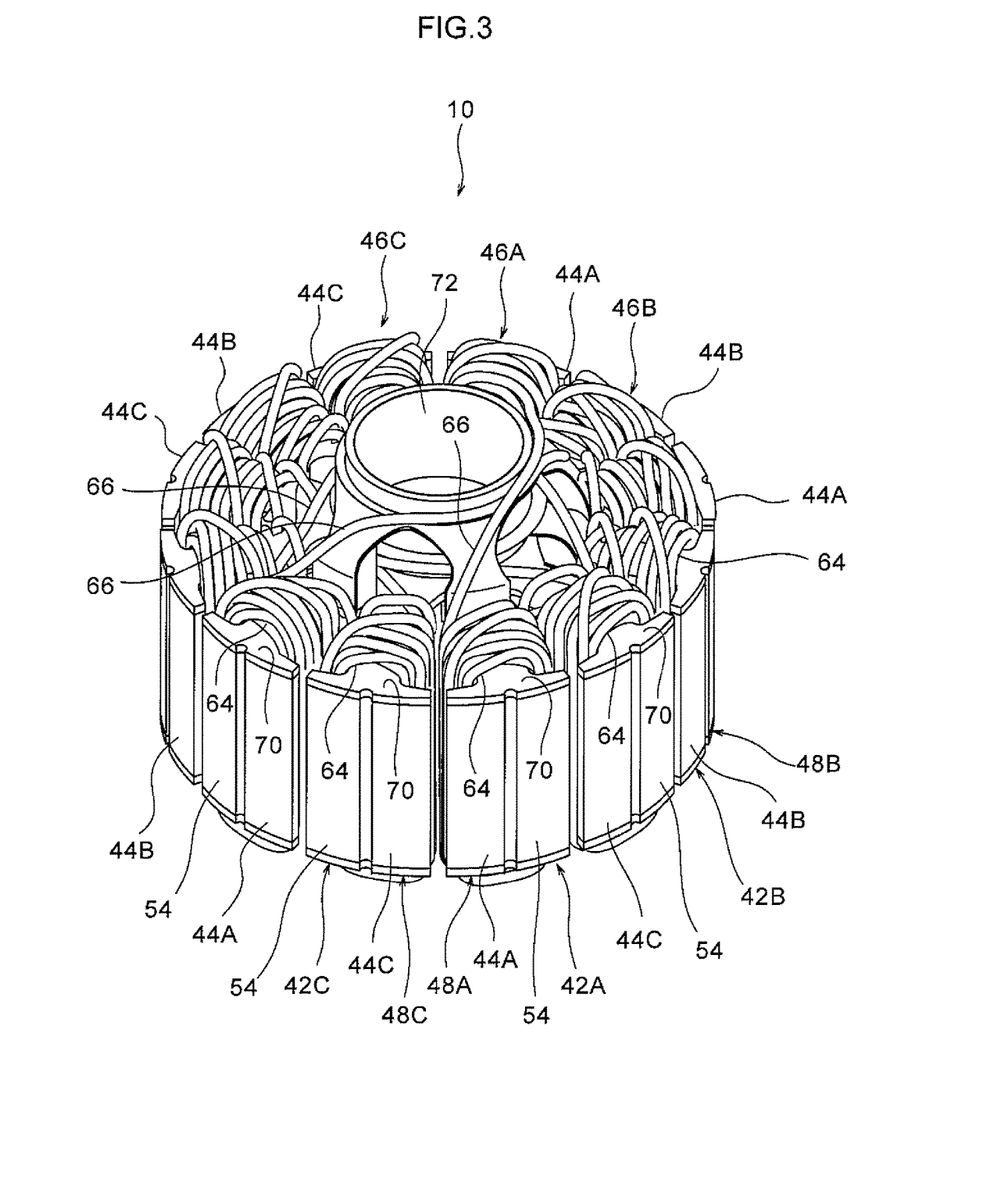
FIG. 3 is a perspective view of an armature according to an exemplary embodiment.
Figure 4:
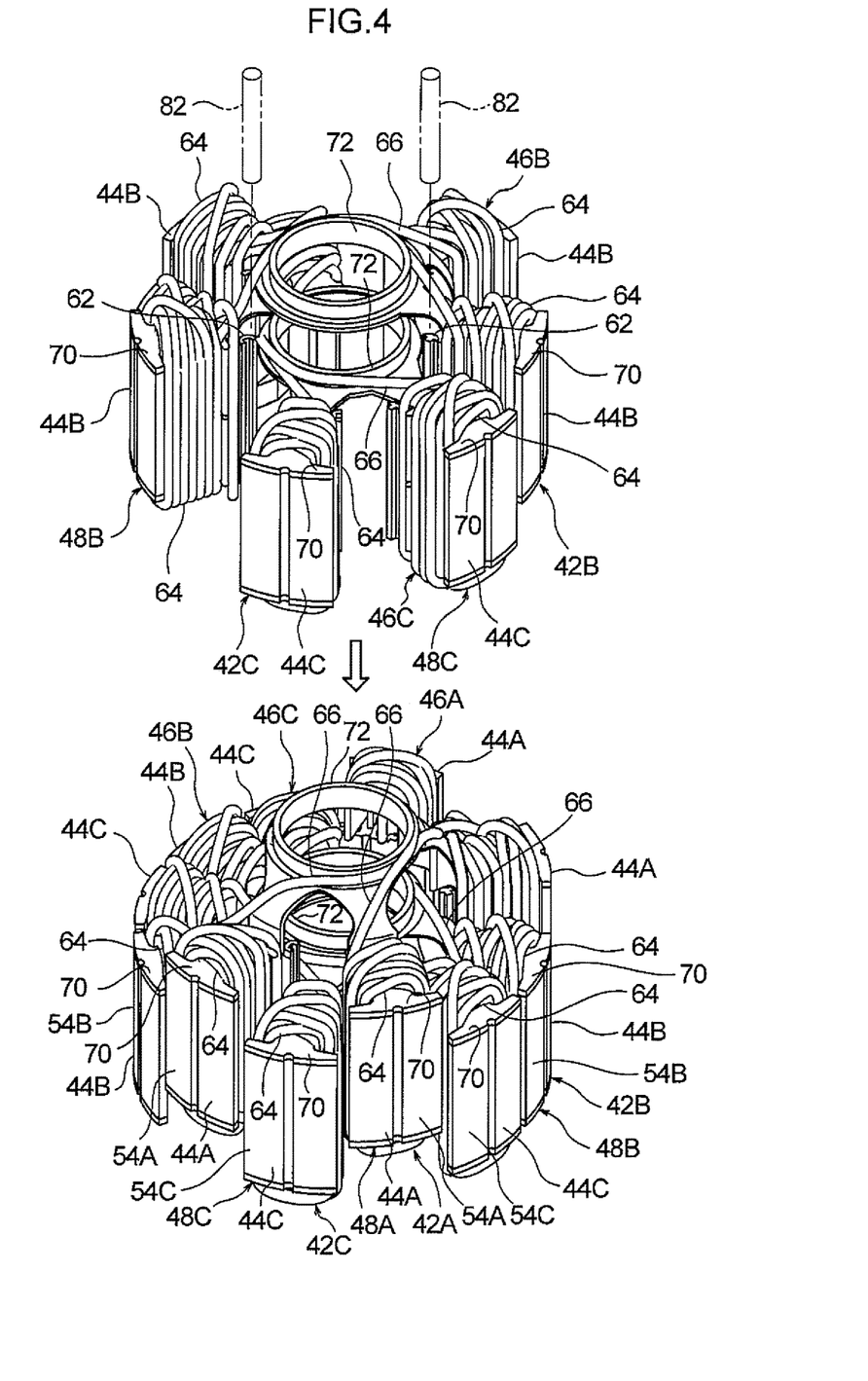
FIG. 4 illustrates a process of assembling an armature according to an exemplary embodiment.

As illustrated in FIG. 2 to FIG. 4, the armature 10 is configured from plural armature configuration section 42A, 42B, 42C groups.

The first group armature configuration section 42A is configured including plural core configuration members 44A, a winding 46A, and an insulator 48A. The second group armature configuration section 42B is configured including plural core configuration members 44B, a winding 46B, and an insulator 48B. The third group armature configuration section 42C is configured including plural core configuration members 44C, a winding 46C, and an insulator 48C.

Figure 5:
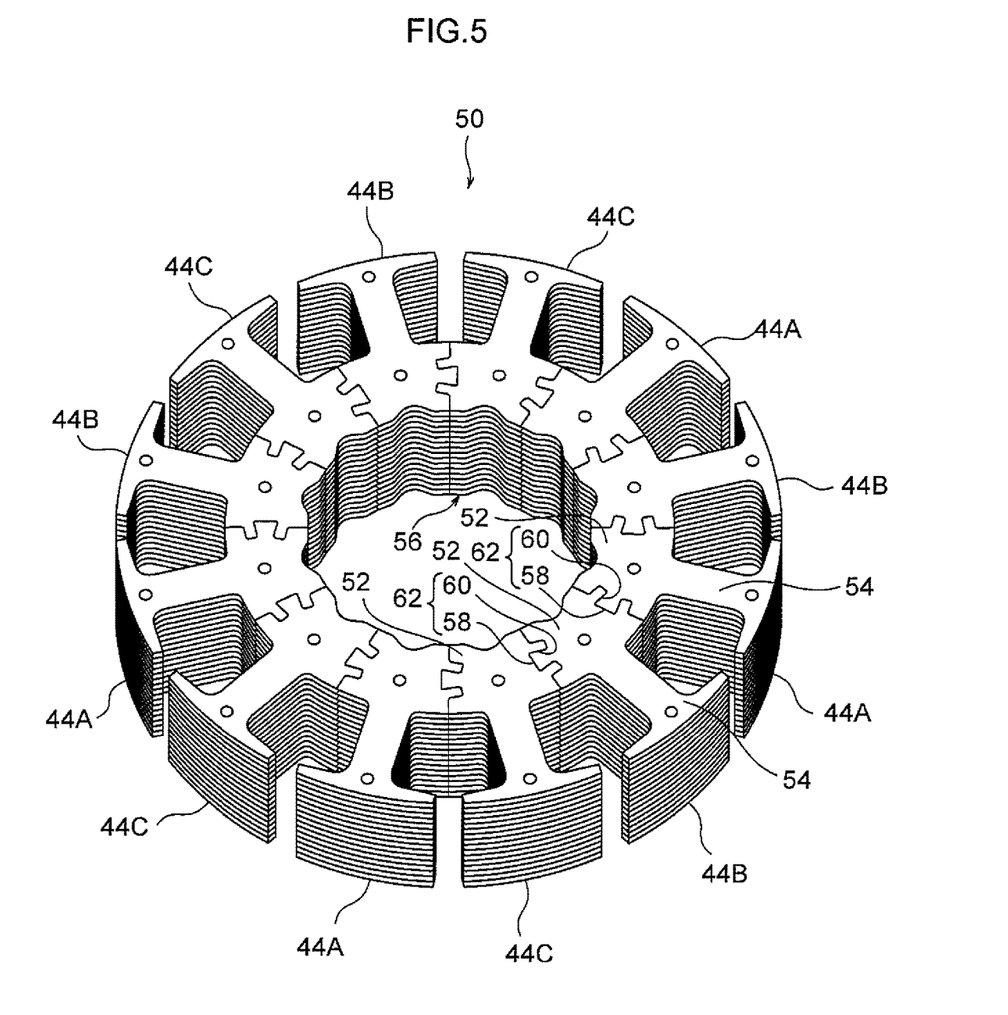
FIG. 5 is a perspective view of an armature core according to an exemplary embodiment.

As illustrated in FIG. 5, the plural core configuration members 44A, 44B, 44C configure a ring shaped armature core 50, and are segmented from each other on progression around the circumferential direction of the armature core 50. The plural core configuration members 44A to 44C all have the same shape as each other, and include plural respective yoke configuration portions 52, and plural respective teeth portions 54. The plural yoke configuration portions 52 configure a ring shaped yoke 56, and are each formed in a circular arc shape. The plural teeth portions 54 are integrally formed to the respective plural yoke configuration portions 52, and are arrayed radiating from the periphery of the yoke 56.

Each of the plural core configuration members 44A to 44C is provided with a protrusion shaped engagement portion 58, and an indented shaped engaged portion 60, respectively. The engagement portions 58 are formed to respective one side portions of the yoke configuration portions 52, and the engaged portion 60 are formed to respective other side portions of the yoke configuration portions 52. The engagement portions 58 and the engaged portions 60 that are adjacent to each other configure fitting portions 62 that couple together each of the adjacent core configuration members out of the plural core configuration members 44A to 44C. The plural core configuration members 44A to 44C are coupled together in a ring shape by the plural fitting portions 62.

As illustrated in FIG. 2 to FIG. 4, each of the windings 46A, 46B, 46C includes plural winding portions 64 and plural crossing wires 66. In each of the groups, the plural winding portions 64 are concentrically wound on the respective teeth portions 54 with insulating portions 70, described later, formed by the respective insulators 48A to 48C, interposed therebetween, and the plural winding portions 64 are connected together by the crossing wires 66. Each of the plural crossing wires 66 are laid out along (wound around) coupling portions 72, described later, formed to the respective insulators 48A to 48C.

The insulators 48A, 48B, 48C are made of resin, and include the plural insulating portions 70 and the coupling portions 72 as a single unit. The same number of plural insulating portions 70 are provided as the number of plural teeth portions 54, described later. The plural insulating portions 70 are integrally mounted to the surfaces of the core configuration members 44A to 44C, described above, by being integrally formed, or fitted together, or the like, and insulate the teeth portions 54 formed to the core configuration members 44A to 44C from the winding portions 64.

The coupling portions 72 are provided at one axial direction side of the plural insulating portions 70. Each coupling portion 72 is formed in a ring shape, and couples the plural insulating portions 70 in each group together. In a state in which the armature configuration sections 42A to 42C of the plural groups are fitted together, the plural coupling portions 72 respectively formed to the insulators 48A to 48C overlap each other in the armature 10 axial direction. Note that the insulators 48A to 48C are formed with substantially the same shape as each other, excepting that the coupling portions 72 are formed at different positions in the armature 10 axial direction.

Figure 6:
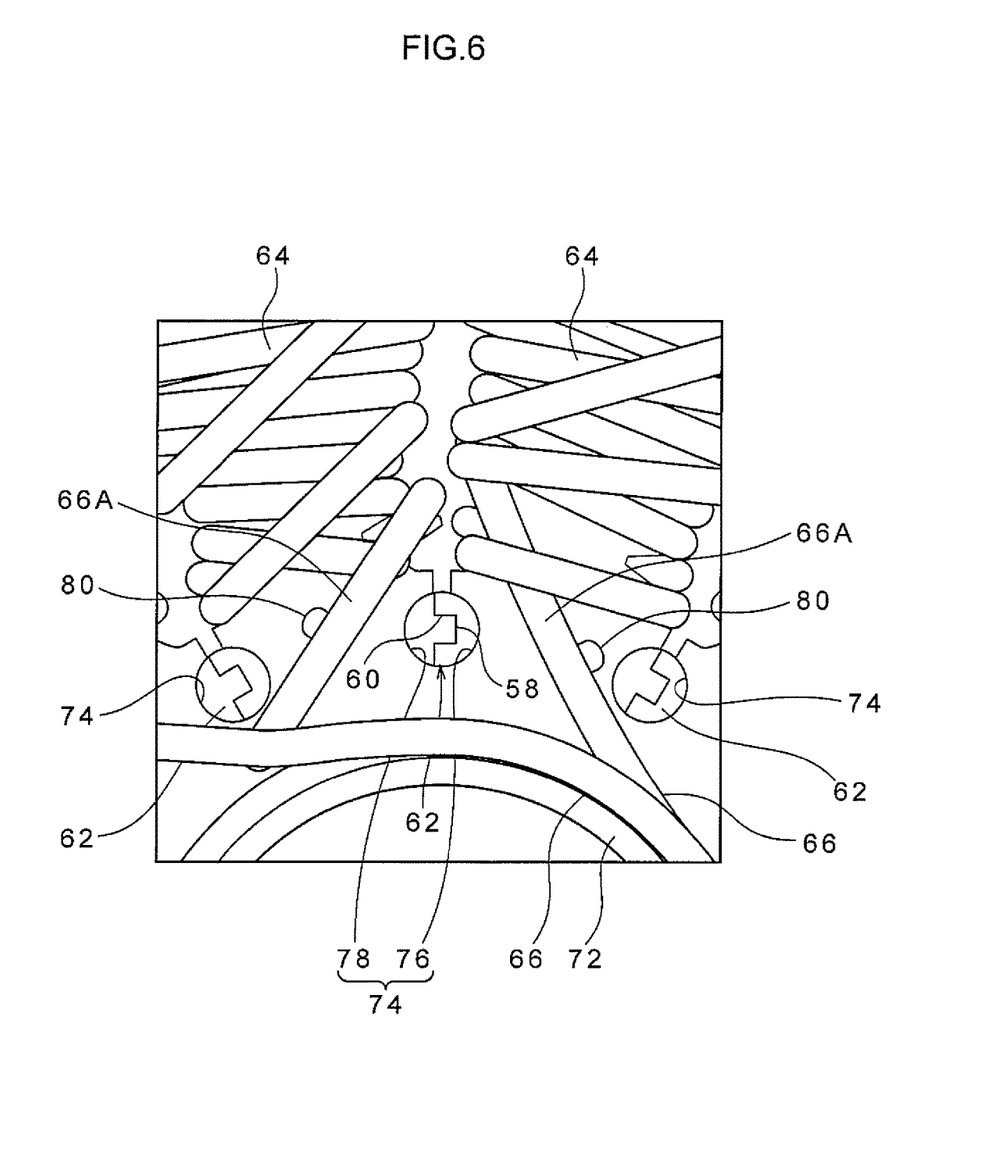
FIG. 6 is an enlarged plan view of relevant portions of an armature according to an exemplary embodiment.

As illustrated in FIG. 2, the insulators 48A to 48C are formed with exposing portions 74 at positions corresponding to the fitting portions 62 when viewed along the armature core 50 axial direction. As illustrated in FIG. 6, each exposing portion 74 is configured by a circular arc shaped cutaway portion 76 formed in a position corresponding to the engagement portion 58, and a circular arc shaped cutaway portion 78 formed in a position corresponding to the engaged portion 60. The fitting portion 62 is therefore exposed when viewed along the armature core 50 axial direction, due to the exposing portion 74 configured by the pair of cutaway portions 76, 78. Due to the combination of the pair of cutaway portions 76, 78 formed in a circular arc shapes, the exposing portion 74 is formed in an approximately circular shape when viewed along the armature core 50 axial direction.

Note that the exposing portions 74 are suitably provided at every 360°/n about the axial center portion of the armature core 50, wherein n is the number of slots between the plural teeth portions 54 formed to the plural core configuration members 44A to 44C. There are 12 slots in the present exemplary embodiment, and so the exposing portions 74 are provided at every 30°.

Figure 7:
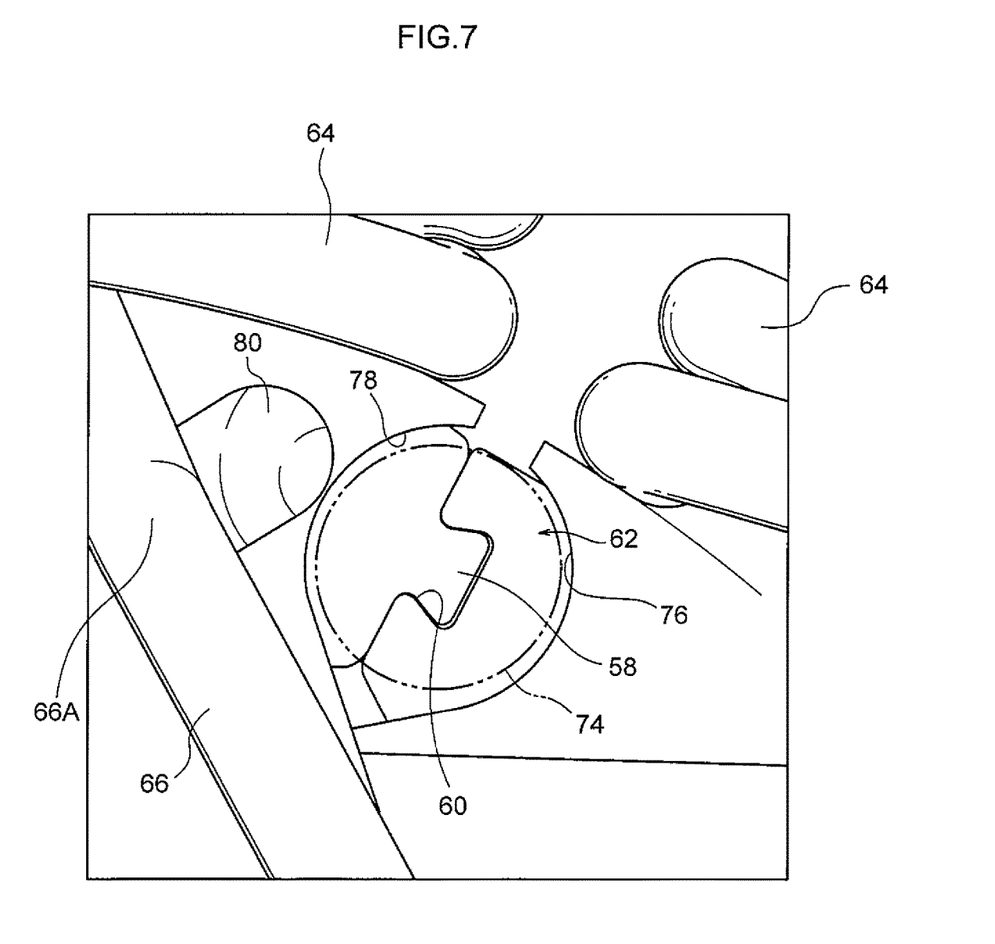
FIG. 7 is an enlarged plan view of relevant portions of an armature according to an exemplary embodiment.
Figure 8A:
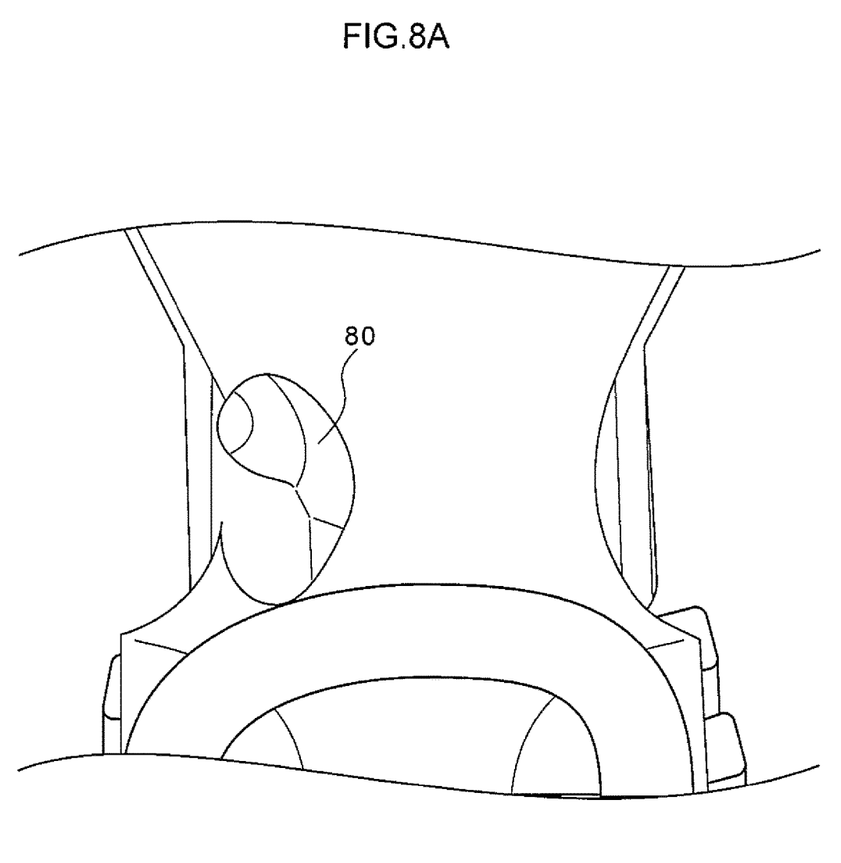
FIG. 8A is an enlarged plan view of relevant portions of an armature according to an exemplary embodiment, illustrating a state prior to crossing a crossing wire.
Figure 8B:
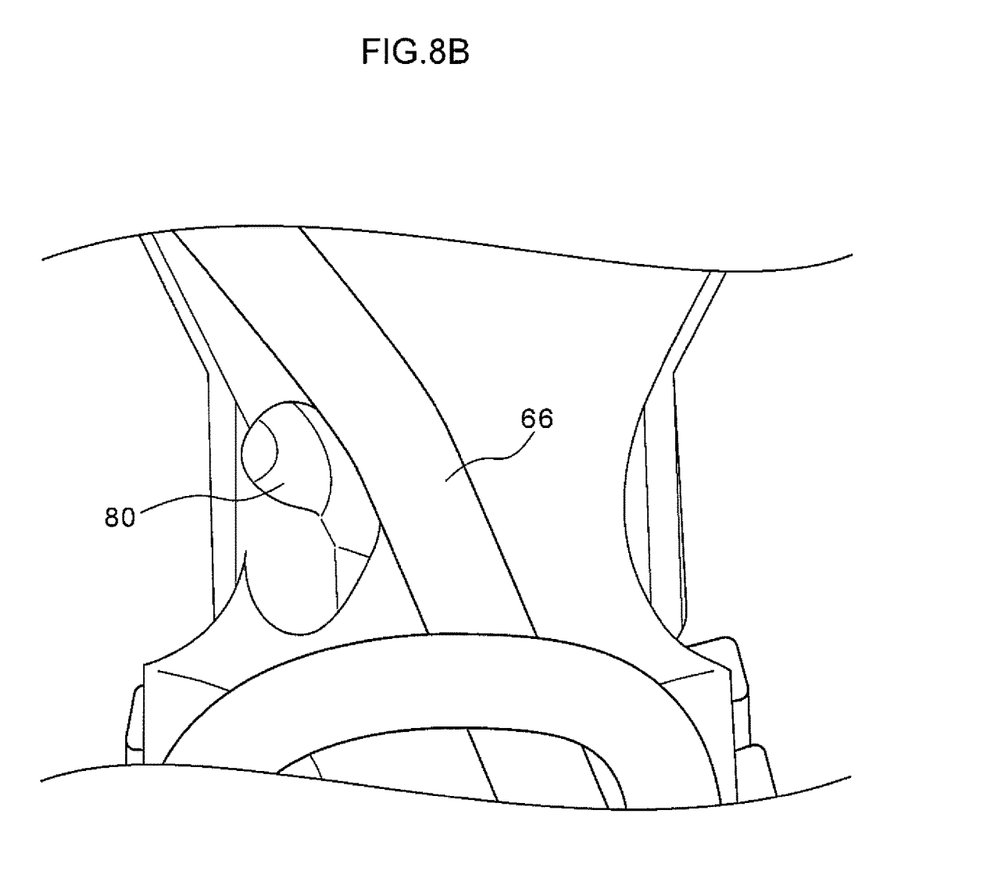
FIG. 8B is an enlarged plan view of relevant portions of an armature according to an exemplary embodiment, illustrating a state after crossing a crossing wire.

Moreover, guide projections 80 with height directions running along the armature 10 axial direction (protruding to the other axial direction side of the armature 10) are provided at connecting portions of the insulating portions 70 and the coupling portions 72 of the insulators 48A to 48C (see also FIG. 7, FIG. 8A and FIG. 8B). As illustrated in FIG. 6, end portions 66A of the plural crossing wires 66 are guided (supported) by the guide projections 80 so as to be positioned between pairs of fitting portions 62 provided at both sides of each of the core configuration members of the plural core configuration members 44A to 44C.

Explanation follows regarding a manufacturing method of the armature 10, formed with the above configuration.

First, as illustrated in FIG. 4, the core configuration members 44A to 44C are respectively assembled to the insulating portions 70 of the insulators 48A to 48C of each group. For each of these groups, the windings 46A to 46C are then wound on the core configuration members 44A to 44C so as to form the winding portions 64 and the crossing wires 66. Each of the plural mutually independent armature configuration sections 42A to 42C is thereby assembled (armature configuration section assembly process).

Next, the armature 10 is assembled by fitting the plural armature configuration sections 42A to 42C together in the axial direction. When this is performed, the exposing portions 74 (see FIG. 2 and FIG. 6) that expose the fitting portions 62 when viewed along the armature core 50 axial direction are formed to the plural insulators 48A to 48C. The fitting portions 62 are thereby pressed and fitted together in the axial direction through the exposing portions 74 by pressing jigs 82 (see FIG. 4) (armature assembly process). The armature 10 is manufactured according to the above procedure.

Explanation follows regarding operation and advantageous effects of the present exemplary embodiment.

As described in detail above, in the present exemplary embodiment, the exposing portions 74, that expose the fitting portions 62 when viewed along the armature core 50 axial direction, are formed to the plural insulators 48A to 48C (see FIG. 2 and FIG. 6). As described above, when assembling the plural armature configuration sections 42A to 42C together in the axial direction, the fitting portions 62 can be pressed and fitted together in the axial direction through the exposing portions 74 by the pressing jigs 82 (see FIG. 4). This enables the fitting portions 62 to be fitted together smoothly while suppressing interference between the pressing jigs 82 and the insulators 48A to 48C, and excellent ease of assembly can thereby be achieved when the plural armature configuration sections 42A to 42C are being fitted together in the axial direction.

The exposing portions 74 are provided at every 360°/n (wherein n is the number of slots) about the axial center portion of the armature core 50, such that the exposing portions 74 are disposed at equal intervals in the armature core 50 circumferential direction. Accordingly, the plural fitting portions 62 can be fitted together with excellent balance by simultaneously pressing the plural fitting portions 62 using the plural pressing jigs 82.

The exposing portions 74 are formed with a circular profile when viewed along the armature core 50 axial direction (see FIG. 2 and FIG. 6). This accordingly enables the maximum surface area of the load bearing faces of the fitting portions 62 to be secured when the fitting portions 62 are being pressed by the pressing jigs 82. This enables the pressing force to be reduced when pressing the fitting portions 62 using the pressing jigs 82.

The guide projections 80 (see FIG. 6 to FIG. 8) are provided at the connecting portions between the respective insulating portions 70 and the coupling portions 72 of the insulators 48A to 48C. Due to being guided by the guide projections 80, end portions 66A of the crossing wires 66 are positioned between the pairs of fitting portions 62 provided at both sides of each of the core configuration members of the plural core configuration members 44A to 44C. The crossing wires 66 can accordingly be suppressed from becoming caught in the fitting portions 62, even when adjacent core configuration members are coupled to each other by fitting the fitting portions 62 together.

Since the armature 10 described above is provided in the rotating electrical device M according to the present exemplary embodiment, ease of assembly of the armature 10 is excellent, and cost reduction can be achieved.

Explanation follows regarding modified examples of the present exemplary embodiment.

Although the armature 10 is configured as a stator of an outer rotor-type brushless motor in the exemplary embodiment described above, configuration may be made as a stator of an inner rotor-type brushless motor.

Although the armature 10 is configured of the three armature configuration sections 42A to 42C, the number of plural armature configuration sections may be different. The number of teeth portions 54 of each of the armature configuration sections 42A to 42C may also be different to that described above.

Each of the exposing portions 74 is formed by the pair of cutaway portions 76, 78, however may be formed by a hole or the like.

The exposing portions 74 are provided at every 360°/n (wherein n is the number of slots) about the axial center portion of the armature core 50, however the exposing portions 74 may be provided at every 360°/(n/2). In such a configuration, the exposing portions 74 are provided at equal intervals in the circumferential direction of the armature core 50, thereby enabling the plural fitting portions 62 to be fitted together with excellent balance when the plural fitting portions 62 are pressed simultaneously by plural pressing jigs 82.

Each of the exposing portions 74 is formed with a circular profile when viewed along the axial direction of the armature core 50, however the exposing portions 74 may be formed with a profile other than a circular profile (such as a rectangular profile or an elliptical profile) when viewed along the armature core 50 axial direction. When the exposing portion 74 is thus formed with a profile other than a circular profile when viewed along the armature core 50 axial direction, the degrees of freedom for the shape of the insulators 48A to 48C can be increased without restricting the shape of the exposing portion 74.

Although explanation has been given regarding an exemplary embodiment of the present invention, the present invention is not limited thereto, and obviously various other modifications may be implemented within a range not departing from the spirit of the present invention.

Explanation follows regarding a reference example.

Figure 9:
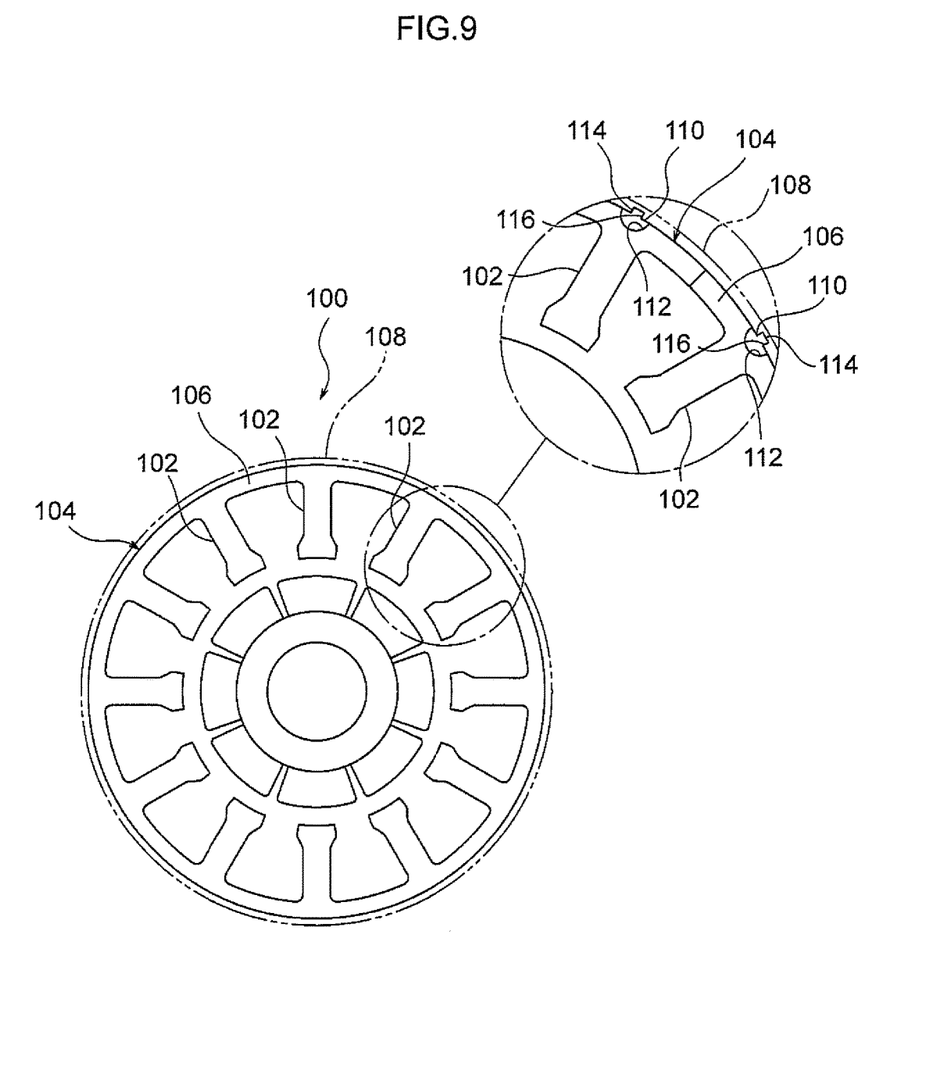
FIG. 9 is a plan view of an armature according to a reference example.

An armature 100 according to the reference example illustrated in FIG. 9 is configured as a stator of an inner rotor type brushless motor, and is provided with: an armature core 104 that includes plural teeth portions 102; insulators 106 mounted to the armature core 104; a cylindrical shaped yoke 108 that is provided to the radial direction outside of the armature core 104; fitting portions 110 that couple the armature core 104 and the yoke 108; and exposing portions 112 that are formed to the plural insulators 106, and that expose the fitting portions 110 when viewed along the axial direction of the armature core 104. Each of the fitting portions 110 is configured by an engagement portion 114 formed to an outer peripheral portion of the armature core 104, and an engaged portion 116 formed to the yoke 108. As an example, each of the exposing portions 112 is formed by a circular arc shape cutaway portion.

In the armature 100 according to the reference example, the fitting portions 110 can be pressed and fitted in the axial direction of the armature core 104 through the exposing portions 112 by pressing jigs. This enables the fitting portions 110 to be fitted together smoothly while suppressing interference between the pressing jigs and the insulators 106, thereby enabling excellent ease of assembly of the armature core 104 and the yoke 108.

The armature with the configuration according to the first aspect of the invention is, for example, manufactured by the following procedure. First, the core configuration members are assembled to the insulating portions of respective insulators, and the windings are wound onto the core configuration members, to assemble each of the plural armature configuration sections (armature configuration section assembly process). Next, the armature is assembled by fitting the plural armature configuration sections together in the axial direction, and fitting together the fitting portions (armature assembly process).

The plural insulators are formed with exposing portions that expose the fitting portions when viewed along the armature core axial direction. This therefore enables the fitting portions to be pressed and fitted together in the axial direction through the exposing portions by a pressing jig when the plural armature configuration sections are being fitted together in the axial direction as described above. This enables the fitting portions to be fitted together smoothly while suppressing interference between the pressing jig and the insulator, and excellent ease of assembly can thereby be achieved when the plural armature configuration sections are being fitted together in the axial direction.

An armature according to a second aspect of the present invention is the armature according to the first aspect, in which the exposing portions are provided at every 360°/n, or at every 360°/(n/2), about an axial center portion of the armature core, wherein n is the number of slots between plural teeth portions formed to the plural core configuration members.

According to this armature, the exposing portions are provided at every 360°/n, or at every 360°/(n/2), wherein n is the number of slots, about the axial center portion of the armature core, such that the exposing portions are disposed at equal intervals in the circumferential direction of the armature core. Accordingly, the plural fitting portions can be fitted together with excellent balance when the plural fitting portions are pressed simultaneously by plural pressing jigs.

An armature according to a third aspect of the present invention is the armature according to the first or the second aspect, in which the exposing portions are formed with a circular profile when viewed along the axial direction of the armature core.

According to this armature, the exposing portions are formed with a circular profile when viewed along the axial direction of the armature core. This accordingly enables the maximum surface area of the load bearing faces of the fitting portions to be secured when the fitting portions are being pressed by pressing jigs. This enables the pressing force to be reduced when pressing the fitting portions using the pressing jigs.

An armature according to a fourth aspect of the present invention is the armature according to the first or the second aspect, in which the exposing portions are formed with a profile other than a circular profile when viewed along the axial direction of the armature core.

According to this armature, the exposing portions are formed with a profile other than a circular profile when viewed along the axial direction of the armature core. Accordingly, the degrees of freedom for the shape of the insulators can be increased, without restricting the shape of the exposing portion.

An armature according to a fifth aspect of the present invention is the armature according to any one of the first to the fourth aspects, in which guide projections are provided at connecting portions of the insulators between the insulating portions and the coupling portions, and end portions of the crossing wires are positioned between pairs of fitting portions provided at both sides of the core configuration members by being guided by the guide projections.

According to this armature, the guide projections are provided at the connecting portions of the insulators between the insulating portions and the coupling portions, and the end portions of the crossing wires are positioned between the pairs of fitting portions provided at both sides of the core configuration members by being guided by the guide projections. Accordingly, the crossing wires can be suppressed from becoming caught in the fitting portions, even when adjacent core configuration members are coupled to each other by the fitting portions being fitted together.

Since the rotating electrical device according to the sixth aspect of the invention is provided with the armature of any one of the first to the fifth aspects, the ease of assembly is excellent, and cost reduction can be achieved.

In this armature manufacturing method, when the plural armature configuration sections are being fitted together in the axial direction, the fitting portions are pressed and fitted together in the axial direction through the exposing portions using the pressing jig. This enables the fitting portions to be fitted together smoothly while suppressing interference between the pressing jig and the insulators, and excellent ease of assembly can thereby be achieved when the plural armature configuration sections are being fitted together in the axial direction.

What is claimed is:
1. An armature comprising:
   a plurality of core configuration members that configure an armature core and are segmented from each other on progression along the circumferential direction of the armature core;
   a plurality of insulators that each include a plurality of insulating portions mounted to the core configuration members and a coupling portion that couples the plurality of insulating portions together;
   a plurality of windings that respectively include a plurality of winding portions, wound on the core configuration members with the insulating portions interposed between the winding portions and the core configuration members, and a crossing wire that connects the plurality of winding portions together;
   a fitting portion, having a protrusion-shaped engagement portion and an indented-shaped engaged portion, that couples together adjacent core configuration members among the plurality of core configuration members; and
   an exposing portion that is configured as a first cutaway portion at the insulator in a position corresponding to the engagement portion of the fitting portion and a second cutaway portion at the insulator in a position corresponding to the engaged portion of the fitting portion, and that exposes the fitting portion through the first cutaway portion and the second cutaway portion combined together, which form a shape corresponding to the cross-sectional profile of a pressing jig when viewed along the axial direction of the armature core, the fitting portion being configured to be pressed through the first cutaway portion and the second cutaway portion combined together by the pressing jig in the axial direction, such that the engagement portion and the engaged portion engage together, the exposing portion and the fitting portion being located at a radial direction inside of the winding portion of the respective windings and outside of the coupling portion of the respective insulators, the armature being used for an outer rotor type motor,
   wherein guide projections project from a top face of connecting portions of the insulators, which connect the insulating portions and the coupling portions, and
   wherein end portions of the crossing wires are positioned above the top face of the connecting portions so as to pass between and not above pairs of fitting portions, which are provided at both sides of the core configuration members, by being guided by the guide projections.

2. The armature of claim 1, wherein:
exposing portions are provided at every 360°/n, or at every 360°/(n/2), about an axial center portion of the armature core, wherein n is the number of slots between a plurality of teeth portions formed to the plurality of core configuration members.

3. The armature of claim 2, wherein:
the first cutaway portion and the second cutaway portion together form a circular profile when viewed along the axial direction of the armature core.

4. The armature of claim 2, wherein:
the first cutaway portion and the second cutaway portion together form a profile other than a circular profile when viewed along the axial direction of the armature core.

5. A rotating electrical device comprising the armature of claim 2.

6. A manufacturing method of the armature of claim 2, wherein the armature manufacturing method comprises:
an armature configuration section assembly process that assembles the plurality of armature configuration sections, in which the core configuration members are assembled to the insulating portions of each of the insulators, and the windings are wound on the core configuration members; and
an armature assembly process that assembles the armature by fitting the plurality of armature configuration sections together in the axial direction, and by pressing and fitting the fitting portions together in the axial direction through the exposing portions using a pressing jig.

7. The armature of claim 1, wherein:
the first cutaway portion and the second cutaway portion together form a circular profile when viewed along the axial direction of the armature core.

8. A rotating electrical device comprising the armature of claim 7.

9. A manufacturing method of the armature of claim 7, wherein the armature manufacturing method comprises:
an armature configuration section assembly process that assembles the plurality of armature configuration sections, in which the core configuration members are assembled to the insulating portions of each of the insulators, and the windings are wound on the core configuration members; and
an armature assembly process that assembles the armature by fitting the plurality of armature configuration sections together in the axial direction, and by pressing and fitting the fitting portions together in the axial direction through the exposing portions using a pressing jig.

10. The armature of claim 1, wherein:
the first cutaway portion and the second cutaway portion together form a profile other than a circular profile when viewed along the axial direction of the armature core.

11. The armature of claim 10, wherein:
guide projections are provided at connecting portions of the insulators between the insulating portions and the coupling portions; and
end portions of the crossing wires are positioned between pairs of fitting portions provided at both sides of the core configuration members by being guided by the guide projections.

12. A rotating electrical device comprising the armature of claim 10.

13. A manufacturing method of the armature of claim 10, wherein the armature manufacturing method comprises:
an armature configuration section assembly process that assembles the plurality of armature configuration sections, in which the core configuration members are assembled to the insulating portions of each of the insulators, and the windings are wound on the core configuration members; and
an armature assembly process that assembles the armature by fitting the plurality of armature configuration sections together in the axial direction, and by pressing and fitting the fitting portions together in the axial direction through the exposing portions using a pressing jig.

14. A rotating electrical device comprising the armature of claim 1.

15. A manufacturing method of the armature of claim 1, wherein the armature manufacturing method comprises:
an armature configuration section assembly process that assembles the plurality of armature configuration sections, in which the core configuration members are assembled to the insulating portions of each of the insulators, and the windings are wound on the core configuration members; and
an armature assembly process that assembles the armature by fitting the plurality of armature configuration sections together in the axial direction, and by pressing and fitting the fitting portions together in the axial direction through the exposing portions using a pressing jig.

* * * * *